United States Patent
Yoshida et al.

(10) Patent No.: US 8,016,002 B2
(45) Date of Patent: Sep. 13, 2011

(54) SEALING/PUMP-UP DEVICE

(75) Inventors: Masaki Yoshida, Kodaira (JP); Yuji Takeda, Kodaira (JP); Shinichi Iwasaki, Tokyo (JP); Rieko Iwasaki, legal representative, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 578 days.

(21) Appl. No.: 12/095,405

(22) PCT Filed: Nov. 28, 2006

(86) PCT No.: PCT/JP2006/323723
§ 371 (c)(1),
(2), (4) Date: Jul. 28, 2008

(87) PCT Pub. No.: WO2007/063852
PCT Pub. Date: Jun. 7, 2007

(65) Prior Publication Data
US 2009/0277534 A1    Nov. 12, 2009

(30) Foreign Application Priority Data
Nov. 29, 2005  (JP) .................................. 2005-376340

(51) Int. Cl.
B29C 73/02    (2006.01)
B65B 31/00    (2006.01)
(52) U.S. Cl. .......................................... 141/38; 152/415
(58) Field of Classification Search .................... 141/38; 152/415
See application file for complete search history.

(56) References Cited

U.S. PATENT DOCUMENTS

| 5,070,917 | A | * | 12/1991 | Ferris et al. ..................... 141/38 |
| 5,386,857 | A | * | 2/1995 | Fogal et al. ..................... 141/38 |
| 6,283,172 | B1 | * | 9/2001 | Thurner ........................... 141/38 |
| 6,412,524 | B1 | * | 7/2002 | Fogal, Sr. ......................... 141/38 |
| 6,454,892 | B1 | * | 9/2002 | Gerresheim et al. .......... 152/503 |
| 6,736,170 | B2 | * | 5/2004 | Eriksen et al. .................. 141/38 |

(Continued)

FOREIGN PATENT DOCUMENTS
DE    202 12 101 U1    1/2003
(Continued)

OTHER PUBLICATIONS

Machine Translation of JP 2005-199618; Kojima Yoshihide; Jul. 28, 2005; all pages.*

(Continued)

Primary Examiner — Gregory Huson
Assistant Examiner — Nicolas A Arnett
(74) Attorney, Agent, or Firm — Sughrue Mion, PLLC

(57) ABSTRACT

A sealing/pump-up device for tire that not only ensures the storability of sealing agent but also realizes rapid supply of sealing agent into a pneumatic tire. By insertion of insert part (60A) of jig (60) in jig insertion aperture (42) of sealing device (10), aluminum seal (30) is burst through by means of boring member (50) to thereby drive the same in the container. As the distal end of the insert part (60A) locates in the vicinity of upper wall surface within liquid agent container (18), a compressor unit is operated to thereby supply compressed air into the liquid agent container (18). As the end portion of first passage (62) provided in the jig (60) lies in a position superior to the liquid surface of sealing agent (32), the compressed air realizes rapid supply of the sealing agent (32) into a pneumatic tire without surfacing in the form of bubbles through the sealing agent (32).

5 Claims, 5 Drawing Sheets

U.S. PATENT DOCUMENTS

| | | | |
|---|---|---|---|
| 6,766,834 B1 * | 7/2004 | Eckhardt | 141/38 |
| 6,789,581 B2 * | 9/2004 | Cowan et al. | 141/38 |
| 6,889,723 B2 * | 5/2005 | Gerresheim et al. | 141/38 |
| 6,964,284 B2 * | 11/2005 | Eckhardt | 141/38 |
| 7,389,800 B2 * | 6/2008 | Hickman et al. | 141/38 |
| 7,798,183 B2 * | 9/2010 | Cegelski et al. | 141/38 |
| 7,854,242 B2 * | 12/2010 | Stehle | 141/38 |
| 2002/0121331 A1 | 9/2002 | Gerreshiem et al. | |
| 2003/0056851 A1 | 3/2003 | Eriksen et al. | |
| 2005/0284536 A1 * | 12/2005 | Kojima et al. | 141/38 |
| 2006/0086403 A1 * | 4/2006 | Kant et al. | 141/38 |
| 2006/0142420 A1 * | 6/2006 | Nakazawa et al. | 523/166 |
| 2006/0272731 A1 * | 12/2006 | Takeda | 141/38 |
| 2008/0145245 A1 * | 6/2008 | Chou | 417/415 |

FOREIGN PATENT DOCUMENTS

| | | |
|---|---|---|
| JP | 58-002731 A | 1/1983 |
| JP | 2000-309254 A | 11/2000 |
| JP | 2004-518560 A | 6/2004 |
| JP | 2005-199618 A | 7/2005 |
| JP | 2005-319615 A | 11/2005 |

OTHER PUBLICATIONS

European Search Report issued in European Application No. 068335272-1253 / 1955841 dated Nov. 5, 2010.

* cited by examiner

SEALING/PUMP-UP DEVICE

CROSS REFERENCE TO RELATED APPLICATIONS

This application is a National Stage of International Application No. PCT/JP2006/323723 filed Nov. 28, 2006, claiming priority based on Japanese Patent Application No. 2005-376340 filed Nov. 29, 2005, the contents of all of which are incorporated herein by reference in its entirety.

TECHNICAL FIELD

The invention relates to a sealing/pump-up device for a tire that injects sealant for sealing a punctured pneumatic tire into the pneumatic tire and supplies compressed air into the pneumatic tire to raise internal pressure of the pneumatic pressure.

BACKGROUND ART

Widely used in recent years is a sealing/pump-up device (hereafter simply referred to as a "sealing device") for a pneumatic tire (hereafter simply referred to as a "tire") that repairs the tire with sealant and pumps it up to predetermined reference internal pressure without replacing the tire and a wheel when the tire gets punctured.

As the above sealing device, there is a sealing device having a liquid agent container for containing liquid sealant and an injection unit mounted with the liquid agent container, for example. In this sealing device, an air supply path that may be connected to an air supply source such as an air compressor and a gas-liquid supply path that may be connected to a pneumatic tire to be sealed communicate with each other through a space inside the liquid agent container and the air supply path and the gas-liquid supply path are respectively provided to the injection unit.

In repairing the punctured pneumatic tire with this sealing device, if the air supply source such as the air compressor is actuated, compressed air is introduced into the liquid agent container from the air inlet through the air supply path, passes through the sealant, and gathers into a space (air layer) above a sealant interface surface. As a result, the sealant is pressurized by the compressed air in the air layer and the pressurized sealant is injected into the pneumatic tire through the gas-liquid supply path. After a specified amount of sealant is injected, the compressed air is supplied into the tire through the liquid agent container and the gas-liquid supply path to pump up the tire.

Because viscosity of the sealant increases upon exposure to air, a seal needs to be attached to a mouth portion, i.e., a portion coupled to the injection unit or, as shown in FIG. 4, an inside plug 100 needs to be attached to an inner side of the mouth portion of the liquid agent container 102 to increase liquid tightness and air tightness to thereby secure storage stability when the agent is not used. To use the sealant, the container has to be opened so that the sealant may be taken out of the container.

There is a device for blowing off the seal with air pressure or pushing out a breakthrough jig with air pressure to break the seal if the mouth portion of the liquid agent container is closed with the seal, for example. There is also a device having a mechanism for switching between flow paths simultaneously with pushing out of the breakthrough jig to introduce air into the container after breaking through the seal.

DISCLOSURE OF THE INVENTION

Problem to be Solved by the Invention

With the above-described device, air is introduced into the container from an upper end of the breakthrough jig. However, the upper end of the breakthrough jig is located in a lower portion of the container and air rises in the form of bubbles through the viscous sealant. As a result, it takes time for air exhausted from the upper end of the breakthrough jig to reach an upper portion of the container to form the air layer. Moreover, many bubbles are formed in the sealant, which retards discharge of the sealant.

On the other hand, if the inside plug 100 is disposed in the liquid agent container 102 filled with the sealant C, as shown in FIG. 4, air is blown out of a pipe 104 protruding into the container to push the inside plug 100 into the container. To secure a space for pushing the inside plug 100 into the container above the inside plug, the pipe 100 is limited in its height h. As a result, it takes time for air (bubbles) exhausted from the pipe 104 to reach an upper portion of the container to form the air layer. Moreover, many bubbles are formed in the sealant, which retards discharge of the sealant from a gas-liquid supply path 106 for discharge of the sealant.

To solve these problems, the upper end of the pipe 104 may be disposed in the upper portion of the container in advance as shown in FIG. 5. However, this complicates a seal structure because the pipe 104 and the gas-liquid supply path 106 needs to be closed to prevent leakage and hardening of the sealant C during storage.

With the above facts in view, it is an object of the present invention to provide a sealing/pump-up device for a tire that secures storage stability of the sealant and realizes rapid supply of the sealant into the pneumatic tire.

Means for Solving Problem

An invention of claim 1 is a sealing/pump-up device for injecting liquid sealant into a punctured pneumatic tire and then supplying compressed air into the pneumatic tire to raise internal pressure of the pneumatic tire, the device comprising: a liquid agent container containing the sealant and having formed at a lower side thereof a discharge hole for discharging the sealant; a seal member for closing the discharge hole to seal the container; an injection unit coupled to the discharge hole and having inside of the injection unit a liquid supply chamber formed at a side of the seal member that is opposite from an inside of the container; a passage provided at the injection unit so as to face the seal member and connecting an outside of the injection unit and the liquid supply chamber; a compressed air supply passage having one end that opens at a middle portion of the passage; an air supply means coupled to the other end of the compressed air supply passage to supply the compressed air; a gas-liquid supply pipe, one end of which is coupled to the liquid supply chamber and the other end of which can be connected to a valve of the pneumatic tire; a perforating member, at least one part of which is inserted into a liquid supply chamber side of the passage to break through the seal member; and a jig capable of being inserted into the passage from outside of the injection unit and comprising a gas communicating path, one end of which opens at a tip end side and the other end of which opens at a side face at a side that is opposite from the tip end side, the one end of the gas communicating path reaching an upper side in the container and the other end of the gas communicating path communicating with the gas supply path of the injection unit when the jig is inserted into the passage.

Next, the operation of the sealing/pump-up device of claim 1 will be described.

First, the other end of the gas-liquid supply pipe is connected to the valve of the punctured tire.

Next, the jig is inserted into the passage in the injection unit. In this way, the perforating member is pushed by the tip end of the jig, breaks through the seal member, and then is pushed into the container and the tip end portion of the jig is inserted into the container. At the same time, the gas communicating path in the jig communicates with the compressed air supply passage in the injection unit.

When the seal member is broken through, the inside of the liquid agent container and the inside of the liquid supply chamber communicate with each other to enable the sealant in the liquid agent container to flow out into the liquid supply chamber.

Then, the air supply means is actuated to supply the compressed air into the container through the gas supply passage and the gas communicating path in the jig. The compressed air that has flowed into the liquid agent container forms an air layer on an upper side in the liquid agent container, the sealant in the liquid agent container is pushed out rapidly into the liquid supply chamber due to pressure (air pressure) and the weight of the sealant itself and supplied rapidly into the pneumatic tire through the liquid supply chamber and the gas-liquid supply pipe.

After all of the sealant is pushed out of the liquid agent container, the compressed air supplied into the container is supplied into the pneumatic tire through the liquid supply chamber and the gas-liquid supply pipe.

With the sealing/pump-up device for the tire of claim 1, the one end of the gas communicating path that opens on the tip end side of the jig may be allowed to reach the upper side in the container by inserting the jig into the passage. Therefore, when the compressed air is supplied, the compressed air does not pass through the liquid sealant (i.e., the compressed air may be supplied directly into a space above the liquid surface of the sealant) or the compressed air passes an extremely short distance in a short time if it passes through the sealant. As a result, the sealant in the container may be discharged in a short time and the sealant not (or hardly) containing air bubbles may be supplied rapidly into the pneumatic tire.

Because the sealant not containing the air bubbles is supplied in a short time into the pneumatic tire, a problem such as increase in viscosity of the sealant until the supply into the pneumatic tire becomes less likely to occur.

Moreover, the liquid agent container is kept air-tight and liquid-tight by the seal member during storage, the structure is simple as compared with sealing of the passage, pipe, and the like.

An invention of claim 2 is the sealing/pump-up device of claim 1, wherein the one end of the gas communicating path is positioned above a small-diameter neck portion of the liquid agent container when the jig is inserted into the passage.

Next, the operation of the sealing/pump-up device of claim 2 will be described.

When the jig is inserted, the one end (i.e., upper end) of the gas communicating path of the jig is positioned above the small-diameter neck portion of the liquid agent container. Therefore, when the compressed air is supplied into the container, the compressed air and the sealant are less likely to mix with each other and a large amount of sealant per unit volume of fluid supplied into the tire may be maintained.

An invention of claim 3 is the sealing/pump-up device of claim 1, wherein the one end of the gas communicating path in the jig is positioned above a liquid surface of the sealant in the container when the jig is inserted into the passage.

Next, the operation of the sealing/pump-up device of claim 3 will be described.

If the jig is inserted, the one end (i.e., upper end) of the gas communicating passage in the jig reaches above the liquid surface of the sealant. Therefore, bubbles are not formed in the sealant when the compressed air is supplied into the container.

An invention of claim 4 is the sealing/pump-up device of claim 1 or claim 2, wherein one part of the perforating member inserted into the passage closes the gas supply passage that opens at the middle portion of the passage.

Next, the operation of the sealing/pump-up device of claim 4 will be described.

Because one part of the perforating member closes the gas supply passage that opens at the middle portion of the passage during storage, intrusion of foreign material into the gas supply passage during storage may be prevented.

An invention of claim 5 is the sealing/pump-up device of any one of claims 1 to 4, wherein a diameter of a portion of the perforating jig that contacts with the seal member is greater than a diameter of the jig.

Next, the operation of the sealing/pump-up device of claim 5 will be described.

The perforating jig is pushed out by the jig to thereby form a hole in the seal member. Because the diameter of the portion of the perforating jig that contacts with the seal member is set to be greater than the diameter of the jig, a diameter of the hole in the seal member is equal to or greater than the diameter of the perforating jig. Because the jig inserted after that is thinner than the hole formed in the seal member, a large gap may be formed between the jig and the hole and the sealing member in the container may be discharged rapidly through the large gap between the jig and the hole.

EFFECT OF THE INVENTION

The sealing/pump-up device of the invention has excellent effects, i.e., securing of storage stability of the sealant and rapid supply of the sealant into the pneumatic tire.

BEST MODE FOR CARRYING OUT THE INVENTION

A sealing/pump-up device according to an exemplary embodiment of the present invention will be described below.

Figure 1:
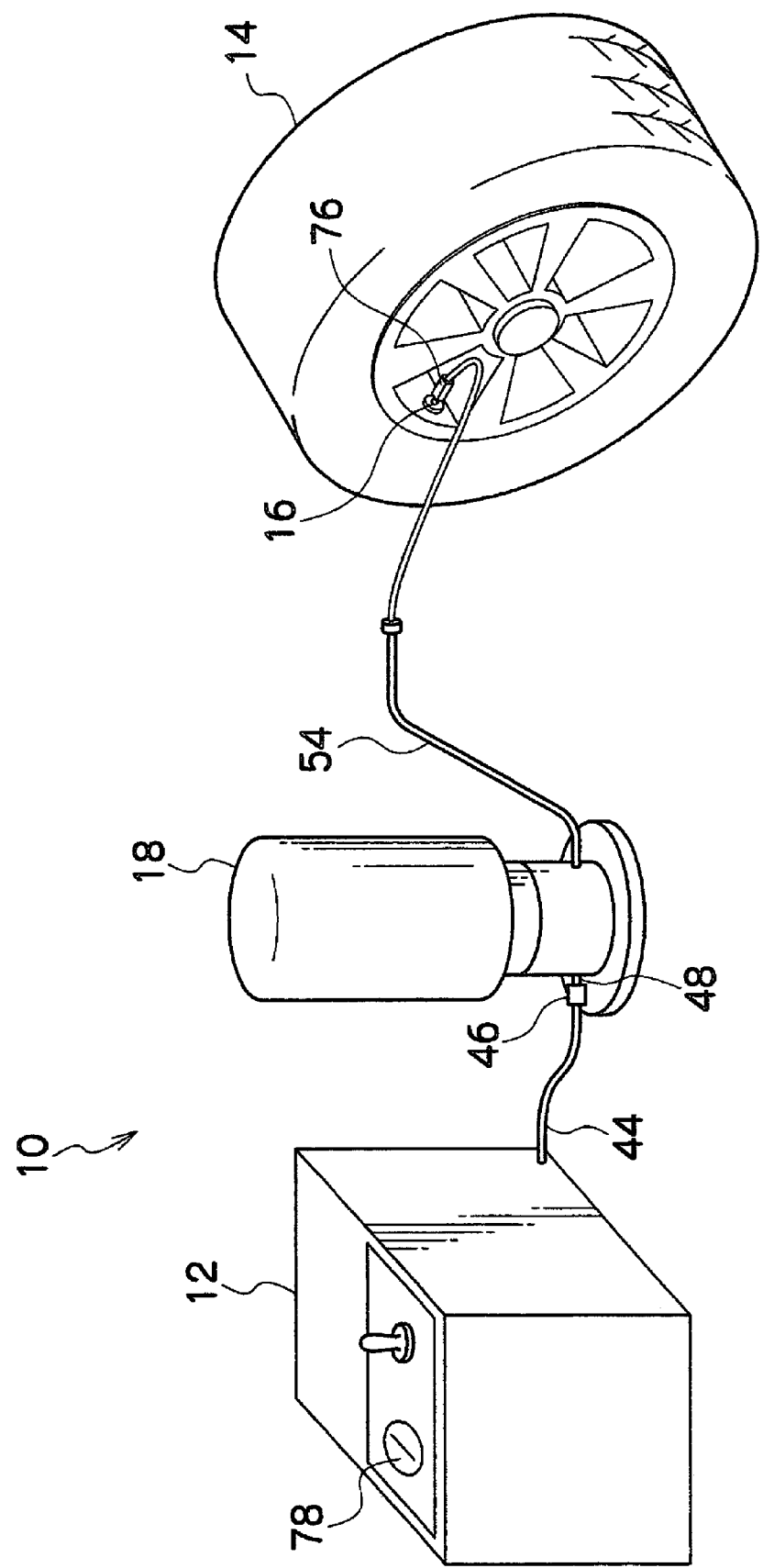
FIG. 1 is a configuration diagram showing a structure of a sealing/pump-up device according to an exemplary embodiment of the present invention.

FIG. 1 shows the sealing/pump-up device (hereafter simply referred to as the "sealing device") for a tire according to the exemplary embodiment of the invention. The sealing device 10 repairs a pneumatic tire (hereafter simply referred to as a "tire") mounted to a vehicle such as an automobile with sealant and pressurizes it (pumps it up) again to predetermined reference internal pressure without replacing the tire and a wheel when the tire gets punctured.

As shown in FIG. 1, the sealing device 10 has a compressor unit 12. In the compressor unit 12, a motor, an air pump, a power circuit, and the like are disposed and a power cable (not shown) extending to the outer unit from the power circuit is provided. By putting a plug provided to a tip end portion of the power cable in a socket of a cigarette lighter installed in the vehicle, a battery mounted on the vehicle may supply power to the motor via the power circuit. Here, the compressor unit 12 can generate higher-pressure compressed air (for example, 300 kPa or higher) than reference pressure specified for each type of tire 14 to be repaired by the air pump.

Figure 2:
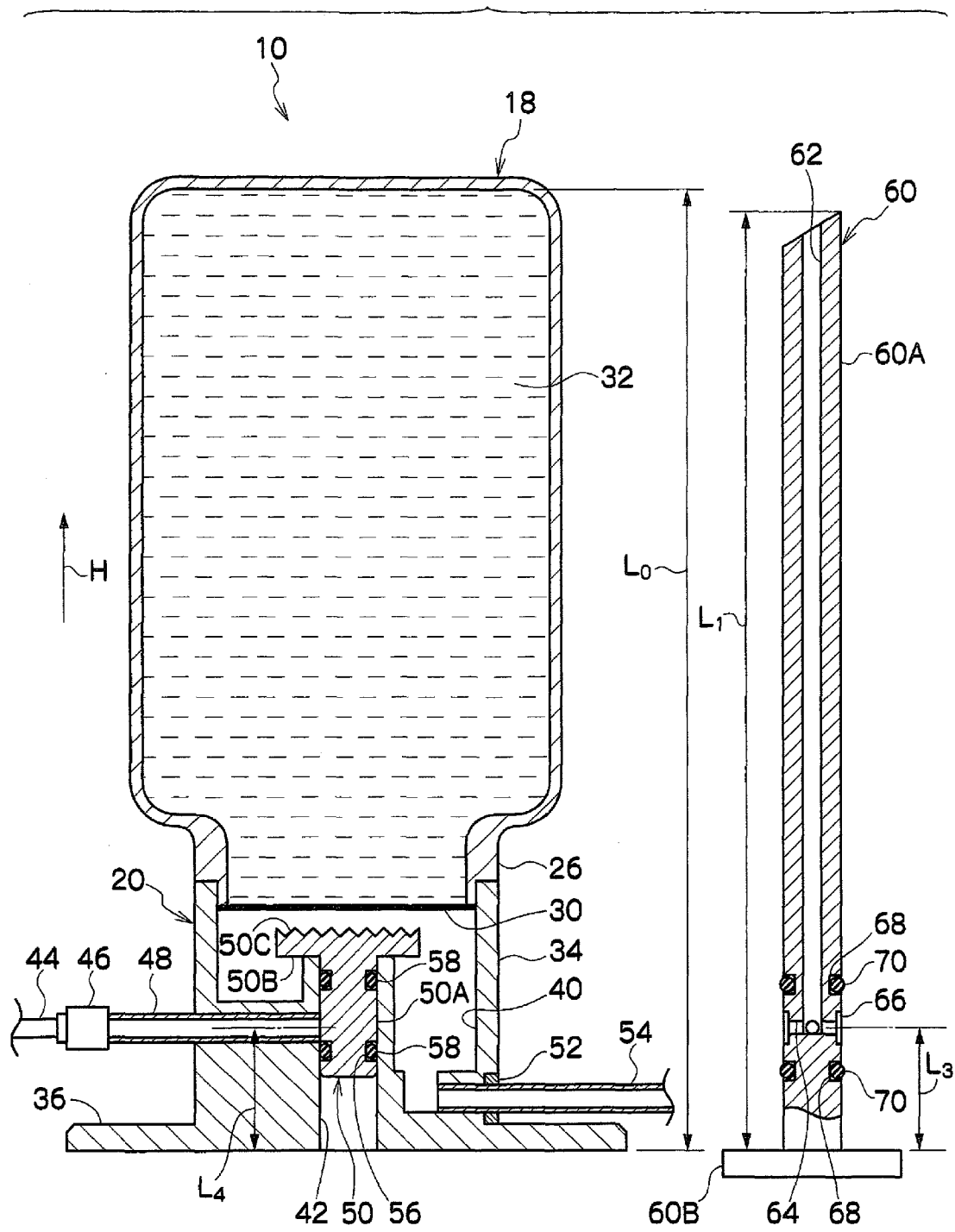
FIG. 2 is a side sectional view showing structures of a liquid agent container and an injection unit in the sealing/pump-up device shown in FIG. 1 and a jig.

As shown in FIG. 2, sealing device 10 is provided with a liquid agent container 18 containing the sealant 32 and an injection unit 20 with which the liquid agent container 18 is fused. At a lower end of the liquid agent container 18, a substantially cylindrical neck portion 26 protruding downward is formed integrally. The neck portion 26 has a smaller diameter than a container main body portion above it. At an opening portion (lower end) of the neck portion 26, an aluminum seal 30 for sealing the sealant 32 in the liquid agent container 18 is disposed.

Here, the liquid agent container 18 is molded of various types of resin material or metal material such as an aluminum alloy having a gas barrier (shielding) property. The liquid agent container 18 is filled with the sealant 32 in an amount slightly larger than a specified amount (for example, 200 g to 400 g) according to the type, size, and the like of the tire 14 to be repaired by the sealing device 10.

Although the liquid agent container 18 of the exemplary embodiment is filled closely with the sealant 32 without containing spaces as shown in FIG. 2, a small amount of inert gas such as Ar may be filled in the liquid agent container 18 together with the sealant 32 before shipping in order to prevent alteration of the sealant 32 due to oxidation, nitriding.

In the sealing device 10, when the liquid agent container 18 is standing upright on the injection unit 20, the sealant 32 in the liquid agent container 18 is pushed under its own weight against the aluminum seal 30 of the liquid agent container 18.

As shown in FIG. 2, the injection unit 20 is provided with a unit main body 34 formed in a substantially cylindrical shape and a plate-shaped leg portion 36 extending toward an outer periphery from a lower end portion of the unit main body 34. A portion of the neck portion 26 of the liquid agent container 18 is pushed into and fused with an upper portion of the unit main body 34.

In the unit main body 34, a substantially circular columnar pressure liquid supply chamber 40 is provided and communicates with an inside of the liquid agent container 18 when the aluminum seal 30 is broken through. To put it concretely, the pressure liquid supply chamber 40 is molded to be deeper on the right side of a center than the left side as shown in FIG. 2.

At a center of the injection unit 20, a jig insertion hole 42 having a circular section and extending vertically from a lower face toward the pressure liquid supply chamber 40 is formed.

The sealing device 10 is also provided with a pressure hose 44 extending out of the compressor unit 12 as shown in FIG. 1 and a pressure pipe 48 extending out of the injection unit 20 and detachably connected to the pressure hose 44 by a joint coupler 46 as shown in FIG. 2. A base end portion of the pressure hose 44 is connected to the air pump in the compressor unit 12 and the compressed air generated by the air pump is supplied toward the pressure hose 44 through the hose 44 during operation of the compressor unit 12. A tip end portion of the pressure pipe 48 passes through a peripheral wall portion of the unit main body 34 and opens at a middle portion of the vertically extending jig insertion hole 42.

A shaft portion 50A of perforating member 50 is inserted into the jig insertion hole 42 at a pressure liquid supply chamber 40 side. The perforating member 50 has a disk-shaped perforating portion 50B spreading radially outside on an upper end portion of the shaft portion 50A. On an upper face of the perforating portion 50B, a plurality of edges 50C for facilitating breakthrough of the aluminum seal 30 are formed.

The shaft portion 50A is formed with a pair of O-ring grooves 56 and O-rings 58 are fitted in the respective O-ring grooves 56.

The shaft portion 50A is fully inserted into the jig insertion hole 42 and the tip end portion of the pressure pipe 48 is closed between the O-ring 58 and the O-ring 58 of the shaft portion 50A.

The shaft portion 50A is retained inside the jig insertion hole 42 by friction between the O-rings 58 and an inner peripheral face of the jig insertion hole 42. In this state, perforating portion 50B faces a front center of the aluminum seal 30 with a small clearance between the perforating portion 50B and the aluminum seal 30.

The sealing device 10 is also provided with a joint hose 54 having a base end portion connected to the unit main body 34 by a nipple 52. The joint hose 54 communicates with an inner face of a lower end side of the pressure liquid supply chamber 40 with the nipple 52 disposed therebetween as shown in FIG. 2. As shown in FIG. 1, a tip end portion of the joint hose 54 is provided with a valve adaptor 76 detachably connected to a tire valve 16 of the tire 14.

(Jig)

Next, a jig 60 used for discharging the sealant 32 from the sealing device 10 will be described.

As shown in FIG. 2, the jig 60 has a rod-shaped insert portion 60A and a disk-shaped base portion 60B integrally formed with an end of the insert portion 60A.

In the insert portion 60A, a first passage 62 extending from a tip end opposite to the base portion toward the base portion is formed at a central portion and a plurality of second passages 64 penetrating from a base portion side end of the first passage 62 to an outer periphery are formed. In an outer peripheral face of the insert portion 60A, an annular groove 66 functioning as an air passage is formed at opening portions of the second passages 64 and a pair of O-ring grooves 68 of is formed on both sides of the groove 66. In the O-ring grooves 68, O-rings 70 are fitted.

Although a tip end of the insert portion 60A of the jig 60 in the exemplary embodiment is inclined as if a tip is cut off diagonally, the tip end may be perpendicular to an axial direction.

A distance $L_1$ from the base portion 60B to the tip end of the first passage 62 of the jig 60 (a distance to a base portion side end portion in the opening of the first passage 62 if the opening is inclined as shown in FIG. 2) is set to be shorter than a distance $L_0$ from a lower face of the leg portion 36 of the sealing device 10 to an inner face of an upper wall of the liquid agent container 18.

A distance $L_3$ from the base portion 60B to the center of the second passages 64 of the jig 60 is set to be the same as a distance $L_4$ from the lower face of the leg portion 36 of the sealing device 10 to a central portion of the pressure pipe 48.

(Operation of the Sealing/Pump-Up Device)

Next, an operation procedure for repairing the punctured tire 14 by using the sealing device 10 according to the exemplary embodiment will be described.

When the tire 14 gets punctured, first, an operator screws the valve adaptor 76 of the joint hose 54 to the tire valve 16 of the tire 14 to make the pressure liquid supply chamber 40 communicate with an inside of the tire 14 through the joint hose 54.

Next, the operator inserts the insert portion 60A of the jig 60 into the jig insertion hole 42 in the sealing device 10 to bring the base portion 60B of the jig 60 that contacts with the leg portion 36 of the sealing device 10. In this way, the perforating portion 50B of the perforating member 50 pushed by the insert portion 60A breaks through the aluminum seal 30 and is pushed into the container and the insert portion 60A enters the container.

Then, the sealing device 10 is placed, for example, on a road surface or the like so that the leg portion 36 is at the bottom and the liquid agent container 18 is at the top.

Figure 3:
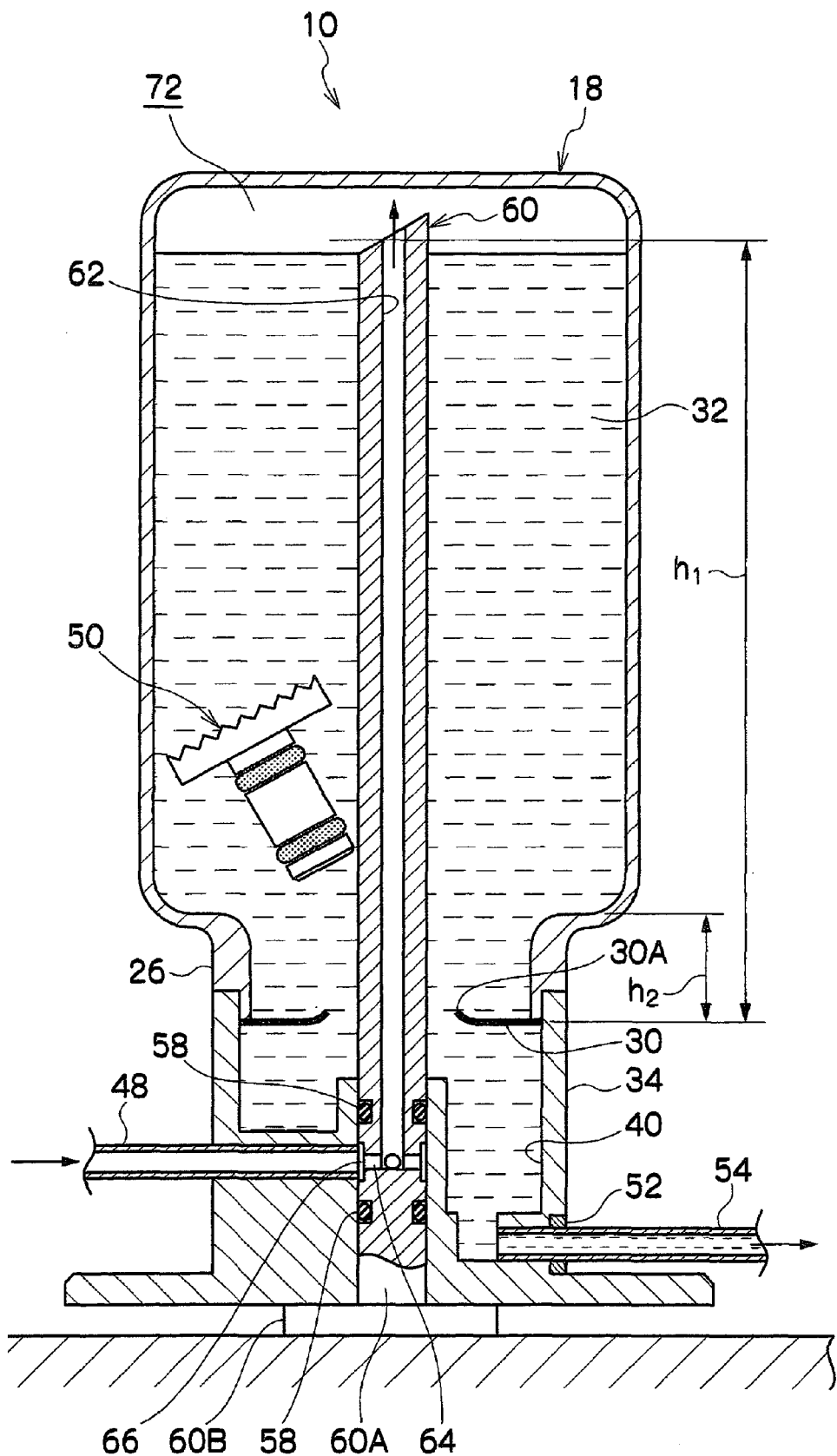
FIG. 3 is a sectional view of the liquid agent container in which the jig is inserted and the injection unit.
Figure 4:
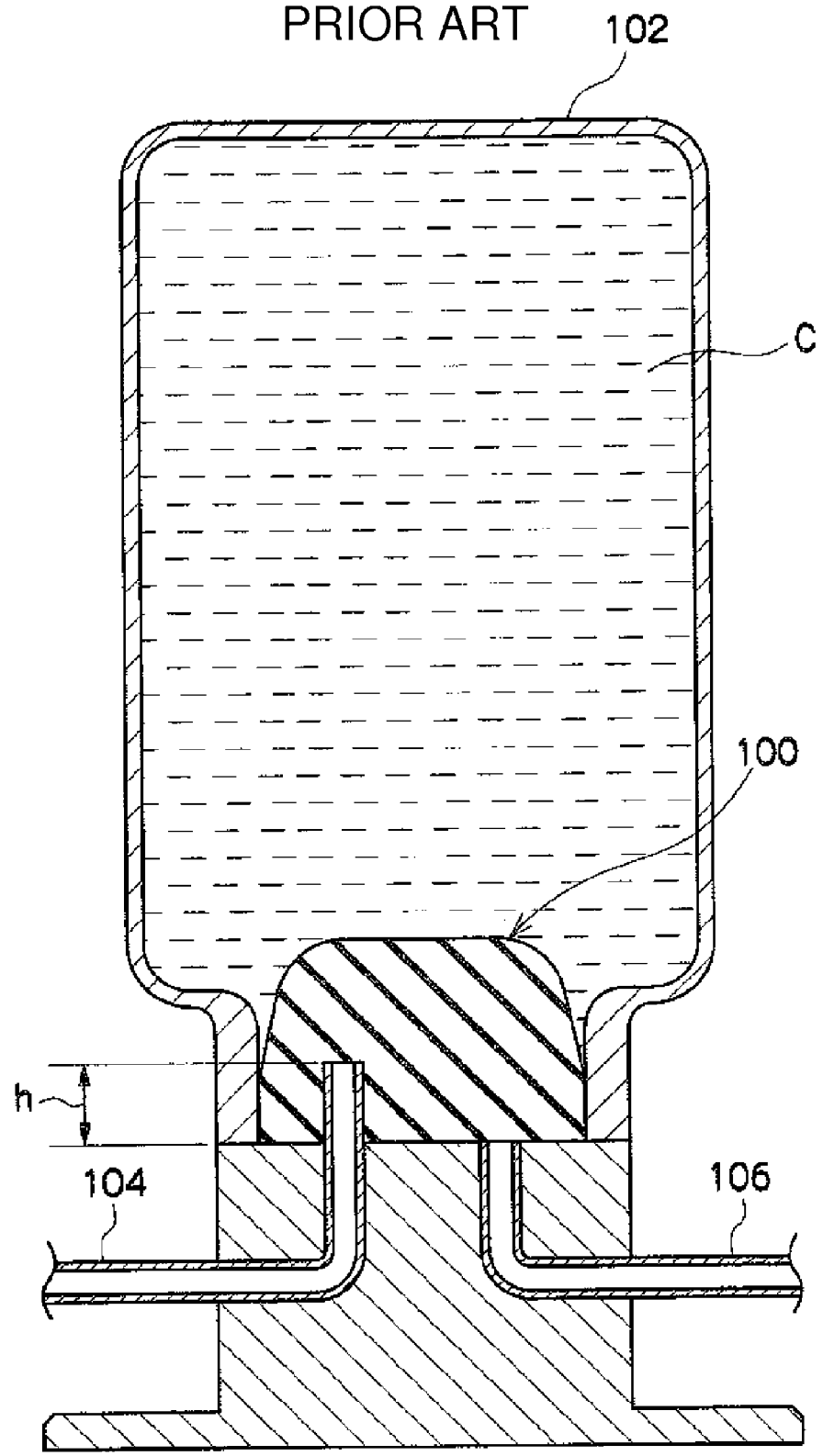
FIG. 4 is a sectional view of a conventional liquid agent container.
Figure 5:
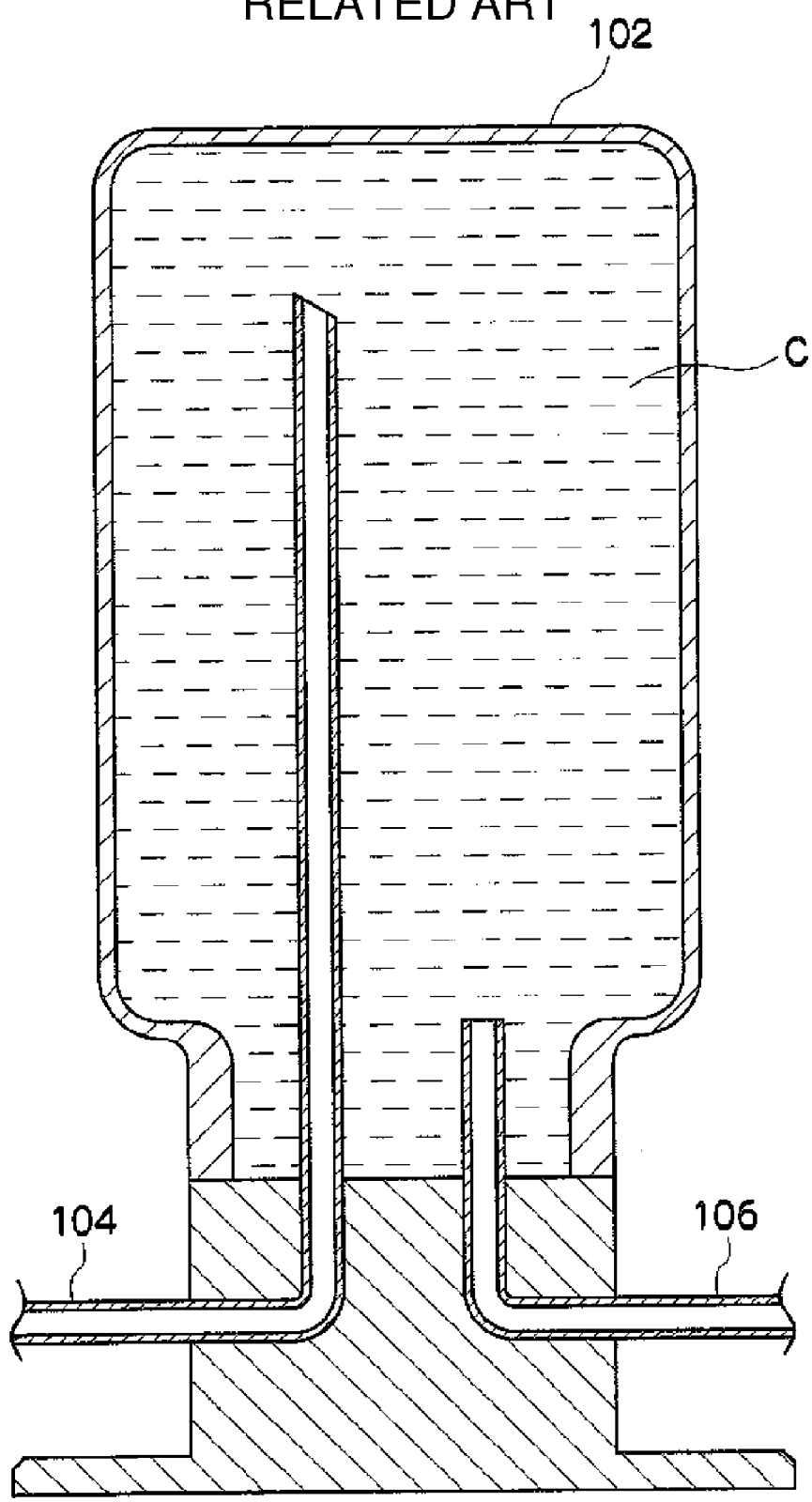
FIG. 5 is a sectional view of another conventional liquid agent container.

When the insert portion 60A of the jig 60 is inserted into the jig insertion hole 42 in the sealing device 10, the tip end of the insert portion 60A is positioned near the inner face of the upper wall of the liquid agent container 18 as shown in FIG. 3, and the sealant 32 in the container flows out into the pressure liquid supply chamber 40 through an annular gap between a hole 30A formed in the aluminum seal 30 and the insert portion 60A. As a result, a space 72 corresponding to the volume of the sealant 32 that has flowed out into the pressure liquid supply chamber 40 is formed in the upper portion of the container, and the end portion of the first passage 62 that opens at the tip end of the insert portion 60A may be positioned above a liquid surface of the sealant 32.

Then, the compressor unit 12 is actuated while retaining the injection unit 20 and the liquid agent container 18 in a state shown in FIG. 3, i.e., positioning the liquid agent container 18 above the injection unit 20. The compressed air generated by the compressor unit 12 is supplied into the liquid agent container 18 via the pressure hose 44, the pressure pipe 48, and the second passages 64 and the first passage 62 in the jig 60. As described above, the end portion of the first passage 62 is positioned above the liquid surface of the sealant 32 and therefore the compressed air does not rise in the form of bubbles through the sealant 32.

When the compressed air is supplied into the container, volume of the space 72 formed in the upper portion of the container increases to pressurize the sealant 32 and the pressurized sealant 32 passes through the pressure liquid supply chamber 40, and the joint hose 54 via the annular gap between the hole 30A formed in the aluminum seal 30 and the insert portion 60A, and is supplied into the pneumatic tire 14.

After all of the sealant 32 in the container is discharged, the sealant 32 in the pressure liquid supply chamber 40 is pressurized, passes through the joint hose 54, and is supplied into the pneumatic tire 14.

Then, when all of the sealant 32 is discharged from the sealing device 10, the compressed air is supplied into the tire 14 through the liquid agent container 18, the pressure liquid supply chamber 40, and the joint hose 54.

Next, if the operator recognizes that the internal pressure of the tire 14 has reached specified pressure by using a pressure gage 78 provided to the compressor unit 12, he/she stops the compressor unit 12 and detaches the valve adaptor 76 from the tire valve 16.

The operator carries out preliminary driving over a certain distance by using the tire 14 into which the sealant 32 has been injected within a certain length of time after completion of inflation of the tire 14. In this way, the sealant 32 is diffused uniformly in the tire 14 to fill and close a puncture hole. After completion of the preliminary driving, the operator measures the internal pressure of the tire 14 again. If necessary, the operator screws the valve adaptor 76 of the joint hose 54 to the tire valve 16 and actuates the compressor unit 12 again to pressurize the tire 14 to the specified internal pressure. Thus, repair of the punctured tire 14 is completed to allow travel over a certain range of distance and at certain or lower speed (for example, 80 Km/h or lower) by using the tire 14.

With the sealing device 10 in the exemplary embodiment, air does not pass through the sealant 32 when the sealant 32 in the container is discharged and therefore the sealant 32 may be rapidly supplied into the tire.

Moreover, the liquid agent container 18 is sealed with the aluminum seal 30, the jig insertion hole 42 is closed with the perforating member 50, the pressure pipe 48 and the pressure liquid supply chamber 40 are sealed to prevent entry of foreign material into the flow path in the device during storage, while outflow of the sealant 32 is allowed by a simple operation, i.e., pushing the jig 60 into the jig insertion hole 42, at the time of use.

In the above exemplary embodiment, the length of the insert portion 60A is set so that the tip end of the first passage 62 of the jig 60 is positioned above the neck portion 26 of the liquid agent container 18. If the tip end of the first passage 62 is above the neck portion 26 of the liquid agent container 18, the sealant 32 is pushed by the compressed air and may be supplied rapidly into the tire. On the other hand, if the tip end of the first passage 62 is below an upper end of the neck portion 62 of the liquid agent container 18, a flow path for the sealant 32 is narrow and therefore the compressed air is mixed with the sealant 32 and sealant 32 may not be supplied rapidly into the tire.

More specifically, the structure that affects speed of supply of the sealant 32 is whether or not the upper end position of the jig 60 is above the narrow neck portion 26 of the liquid agent container 18. If the upper end position of the jig 60 is above the narrow neck portion 26 of the liquid agent container 18, a position where the compressed air is released in the liquid agent container is in a wide portion of the flow path through which the sealant 32 flows toward the hole 30A and therefore the compressed air and the sealant 32 are less likely to mix with each other and a large amount of sealant 32 per unit volume of fluid supplied into the tire may be maintained. On the other hand, if the upper end position of the jig 60 is below the upper end of the neck portion 26 of the liquid agent container 18, the compressed air is released in a narrow portion of the flow path through which the sealant 32 flows toward the hole 30A and therefore the compressed air is likely to mix with the sealant 32, an amount of sealant 32 per unit volume of the fluid supplied into the tire reduces, efficiency is impaired, and injection time is shortened.

Experiment Example

Relationships between injection time of the sealant into the tire, a distance $h_1$ from the tip end of the first passage 62 of the jig 60 (from the base portion side end portion of the opening if the opening of the first passage 62 is inclined as shown in FIG. 2) to the lower end (hole 30A) of the neck portion 26 of the liquid agent container 18, and a distance $h_2$ from the upper end of the neck portion 26 to the hole 30A were examined by experiment by using an actual device.

In the device used in the experiment, the injection time of the sealant into the tire was measured by producing a plurality of jigs 60 of different lengths while changing the distance $h_1$ from the tip end of the first passage 62 to the hole 30A of the liquid agent container 18 as shown in FIG. 3.

The compressed air was at pressure of 350 kPa and environmental temperature was 20° C.

Results of the experiment are as shown in the following Table 1 and show that the injection time is shorter when the distance $h_1$ is longer than the distance $h_2$.

TABLE 1

| $h_1$ (mm) | $h_2$ (mm) | Injection time (second) | Evaluation |
|---|---|---|---|
| 0 | 10 | 25 | △ |
| 10 | 10 | 20 | △ |
| 30 | 10 | 18 | ○ |
| 50 | 10 | 18 | ○ |

○ = good;
△ = somewhat bad

INDUSTRIAL APPLICABILITY

The device is suitable for securing of storage stability of the sealant and for rapid supply of the sealant into the pneumatic tire.

DESCRIPTION OF THE REFERENCE NUMERALS

| | |
|---|---|
| 10 | sealing device |
| 12 | compressor unit |
| 14 | tire |
| 16 | tire valve |
| 18 | liquid agent container |
| 20 | injection unit |
| 26 | neck portion |
| 30 | aluminum seal |
| 32 | sealant |
| 34 | unit main body |
| 36 | leg portion |
| 42 | jig insertion hole (passage) |
| 40 | pressure liquid supply chamber |
| 44 | pressure hose |
| 46 | joint coupler |
| 48 | pressure pipe (compressed air supply passage) |
| 50 | perforating member |
| 52 | nipple |
| 54 | joint hose (gas-liquid distribution pipe) |
| 62 | first passage (gas communicating path) |
| 64 | second passage (gas communicating path) |

The invention claimed is:

1. A sealing/pump-up device for injecting liquid sealant into a punctured pneumatic tire and then supplying compressed air into the pneumatic tire to raise internal pressure of the pneumatic tire, the device comprising:

a liquid agent container containing the sealant and having formed at a lower side thereof a discharge hole for discharging the sealant;

a seal member for closing the discharge hole to seal the container;

an injection unit coupled to the discharge hole and having inside of the injection unit a liquid supply chamber formed at a side of the seal member that is opposite from an inside of the container;

a passage provided at the injection unit so as to face the seal member and connecting an outside of the injection unit and the liquid supply chamber;

a compressed air supply passage having one end that opens at a middle portion of the passage;

an air supply means coupled to the other end of the compressed air supply passage to supply the compressed air;

a gas-liquid supply pipe, one end of which is coupled to the liquid supply chamber and the other end of which can be connected to a valve of the pneumatic tire;

a perforating member, at least one part of which is inserted into a liquid supply chamber side of the passage to break through the seal member; and a jig capable of being inserted into the passage from outside of the injection unit and comprising a gas communicating path, one end of which opens at a tip end side and the other end of which opens at a side face at a side that is opposite from the tip end side, the one end of the gas communicating path reaching an upper side in the container and the other end of the gas communicating path communicating with the gas supply path of the injection unit when the jig is inserted into the passage; wherein the jig and perforating member are separated from each other.

2. The sealing/pump-up device of claim 1, wherein the one end of the gas communicating path is positioned above a small-diameter neck portion of the liquid agent container when the jig is inserted into the passage.

3. The sealing/pump-up device of claim 1, wherein the one end of the gas communicating path reaches above a liquid surface of the sealant in the container when the jig is inserted into the passage.

4. The sealing/pump-up device of claim 1, wherein one part of the perforating member inserted into the passage closes the compressed air supply passage that opens at the middle portion of the passage.

5. The sealing/pump-up device of claim 1, wherein a diameter of a portion of the perforating member that contacts with the seal member is greater than a diameter of the jig.

* * * * *